United States Patent
Kotani (10) Patent No.: US 8,335,393 B2
(45) Date of Patent: Dec. 18, 2012

(54) IMAGE PROCESSING APPARATUS AND IMAGE PROCESSING METHOD

(75) Inventor: Takuya Kotani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 503 days.

(21) Appl. No.: 12/646,874

(22) Filed: Dec. 23, 2009

(65) Prior Publication Data

US 2010/0177979 A1    Jul. 15, 2010

(30) Foreign Application Priority Data

Jan. 9, 2009    (JP) ................................ 2009-003995

(51) Int. Cl.
  *G06K 9/00* (2006.01)
  *G06K 9/40* (2006.01)
(52) U.S. Cl. ........ 382/263; 382/154; 382/260; 382/261; 382/266
(58) Field of Classification Search .................. 382/154, 382/260, 261, 263, 266
See application file for complete search history.

(56) References Cited

U.S. PATENT DOCUMENTS

| 6,057,909 | A * | 5/2000 | Yahav et al. | 356/5.04 |
| 6,665,448 | B1 * | 12/2003 | Maurer | 382/261 |
| 8,050,498 | B2 * | 11/2011 | Wilensky et al. | 382/173 |
| 8,059,911 | B2 * | 11/2011 | Chen et al. | 382/266 |
| 2007/0230944 | A1 | 10/2007 | Georgiev | |
| 2007/0252074 | A1 | 11/2007 | Ng et al. | |

FOREIGN PATENT DOCUMENTS

| JP | 07-139912 A | 6/1995 |
| JP | 08-163423 | 6/1996 |
| JP | 2000-156816 | 6/2000 |
| JP | 2006-067521 | 3/2006 |
| JP | 2008-243184 A | 10/2008 |

OTHER PUBLICATIONS

The above references were cited in a Oct. 29, 2012 Japanese Office Action, a copy of which is enclosed without an English Translation, that issued in Japanese Patent Application No. 2009-003995.

* cited by examiner

*Primary Examiner* — Anand Bhatnagar
*Assistant Examiner* — Soo Park
(74) *Attorney, Agent, or Firm* — Cowan, Liebowitz & Latman, P.C.

(57) ABSTRACT

The invention provides an image processing apparatus which corrects a captured image obtained by capturing an object, the apparatus comprising: an acquiring unit configured to acquire, for each pixel of the captured image, information on an object distance representing a distance to the object; a calculating unit configured to calculate, based on the information on the object distance, a difference in the object distance between a pixel of interest in the captured image and a surrounding pixel of the pixel of interest; a parameter setting unit configured to set a sharpening process parameter for the pixel of interest based on the calculated difference in the object distance; and a sharpening process unit configured to perform a sharpening process for the pixel of interest by using the set parameter.

14 Claims, 9 Drawing Sheets

IMAGE PROCESSING APPARATUS AND IMAGE PROCESSING METHOD

BACKGROUND OF THE INVENTION

1. Field of the Invention

The present invention relates to an image processing apparatus and image processing method for correcting sharpness.

2. Description of the Related Art

Recently, a refocus processing technique capable of changing the shooting distance and the depth of field after shooting has received attention. US2007/0252074A1 describes a technique capable of changing the shooting distance and the depth of field after shooting by using light field photography (to be referred to as LFP). Refocus processing has a feature of obtaining an image at an arbitrary shooting distance and an arbitrary depth of field by setting a virtual shooting distance and compositing multi-viewpoint images in consideration of the distance.

In LFP, a microlens array is arranged in front of an image sensor and multi-viewpoint images can be obtained by one shooting, which cannot be obtained by a general camera. US2007/0230944A1 describes a technique of implementing refocus processing by obtaining multi-viewpoint images by a multi-eye camera.

The object distance of each pixel can be attained by applying these refocus processing. Using LFP, it is conceivable to generate a distance map by holding, for each pixel, a distance at which the local contrast maximizes, while moving the virtual shooting distance from the shortest one to infinity.

Japanese Patent Laid-Open No. 8-163423 discloses a technique of generating a distance map. More specifically, many images are captured while actually changing the shooting distance from the shortest one to infinity. Images in which the local contrast maximizes are selected and mapped for respective pixels.

Japanese Patent Laid-Open No. 2000-156816 discloses a technique of performing sharpness processing corresponding to the object distance in shooting by using a distance map obtained in this way. Japanese Patent Laid-Open No. 2006-67521 discloses a technique of dividing an image into regions such as a short distance, middle distance, and far distance and applying different filters in accordance with the distances. A 3D image can be obtained from 2D images by applying different filter processes in accordance with distances relative to an object distance (shooting distance) arbitrarily set for an image.

As described above, the conventional sharpness processing is applied in accordance with a distance relative to an arbitrarily designated object distance (shooting distance).

When the object is positioned in front of a far background, it is not preferable to equally handle the texture of the object surface and the boundary between the object and the background, that is, apply the same sharpness processing to the texture of the object surface and the boundary between the object and the background. When the degree of sharpening is changed depending on a distance relative to a distance (shooting distance) set in advance for an image and an image to be finally obtained is a deep-focus image, the image undergoes almost the same processing as simple sharpness processing, failing to obtain a 3D output.

When obtaining a distance map according to the method described in Japanese Patent Laid-Open No. 8-163423, many images of the same resolution as the final output image are used, requiring a very large capacity of the work memory or recording medium.

Refocus processing can provide a distance map by using only a work memory or recording medium necessary to take one shot. However, images at a plurality of viewpoints are recorded on one image, so the resolution of an output image decreases depending on the number of viewpoints.

SUMMARY OF THE INVENTION

The present invention has been made to solve the above-described problems separately or at once, and can provide an image processing apparatus and image processing method having the following function. That is, the apparatus and method improve separation between the object and the background by applying, to a captured image, sharpness processing corresponding to how much the distance changes in a local region.

Thus, an image processing apparatus according to the present invention comprises the following arrangement.

According to one aspect of the invention, the invention provides an image processing apparatus which corrects a captured image obtained by capturing an object, the apparatus comprising: an acquiring unit configured to acquire, for each pixel of the captured image, information on an object distance representing a distance to the object; a calculating unit configured to calculate, based on the information on the object distance, a difference in the object distance between a pixel of interest in the captured image and a surrounding pixel of the pixel of interest; a parameter setting unit configured to set a sharpening process parameter for the pixel of interest based on the calculated difference in the object distance; and a sharpening process unit configured to perform a sharpening process for the pixel of interest by using the set parameter.

The image processing apparatus of the present invention having this arrangement can improve separation between the object and the background by applying, to a captured image, sharpness processing corresponding to how much the distance changes in a local region.

Further features of the present invention will become apparent from the following description of exemplary embodiments (with reference to the attached drawings).

DESCRIPTION OF THE EMBODIMENTS

First Embodiment

●Camera Arrangement

Figure 1:
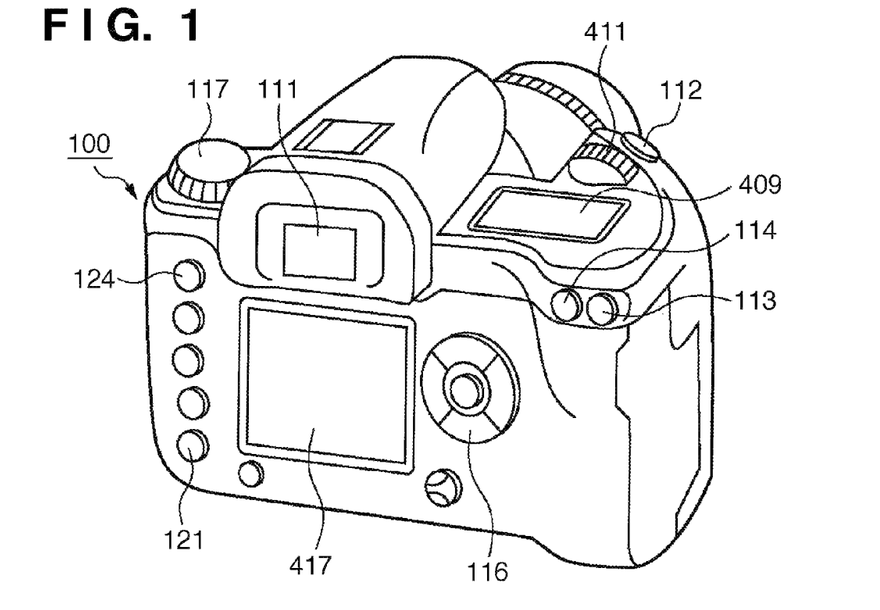
FIG. 1 is a view showing the outer appearance of a digital camera.

FIG. 1 is a view showing the outer appearance of a digital camera in the embodiment.

The top of a camera body 100 includes a viewfinder eyepiece window 111, an auto exposure (AE) lock button 114, a button 113 for selecting a focus measuring point in auto focus (AF), and a release button 112 for performing a shooting operation. The top also includes a shooting mode selection dial 117, external display 409, and electronic dial 411.

The electronic dial 411 is a multifunctional signal input unit for inputting a numerical value to the camera in combination with another operation button, or switching the shooting mode. The external display 409 formed from an LCD panel displays shooting conditions (e.g., shutter speed, aperture value, and shooting mode), and other kinds of information.

The rear side of the camera body 100 includes an LCD monitor 417 for displaying an image captured by the camera, a shot image, various setup windows, and the like, a switch 121 for turning on/off the display of the LCD monitor 417, a four-way selector key 116, and a menu button 124. The LCD monitor 417 is transmissive. By only driving the LCD monitor 417, the user cannot see an image. The LCD monitor 417 therefore requires a backlight, which will be described later.

The four-way selector key 116 includes four buttons arranged at the top, bottom, right, and left, and a SET button arranged at the center. The user uses the four-way selector key 116 to instruct the camera to select or execute a menu item or the like displayed on the LCD monitor 417.

The user uses the menu button 124 to display a menu window on the LCD monitor 417. For example, when selecting and setting the shooting mode, the user presses the menu button 124, and manipulates the top, bottom, right, and left buttons of the four-way selector key 116 to select a shooting mode he wants. While the desired shooting mode is being selected, the user presses the SET button, completing the setting of the shooting mode. The menu button 124 and four-way selector key 116 are also used to set the AF mode to be described later.

Figure 2:
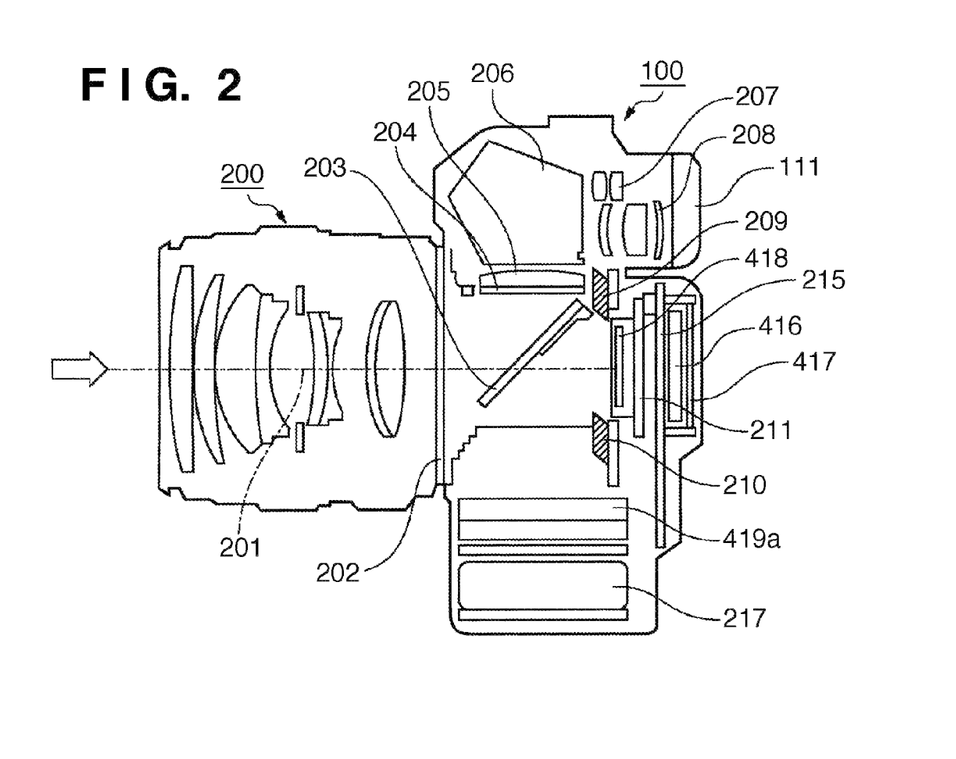
FIG. 2 is a vertical sectional view of the digital camera.

FIG. 2 is a vertical sectional view of the digital camera.

A photographing lens 200 in the shooting optical system is detachable from the camera body 100 via a lens mount 202.

A mirror 203 is inserted in the photographing optical path having a photographing optical axis 201 as a center. The mirror 203 can quickly return between a position (inclined mirror position) where it guides object light traveling from the photographing lens 200 to the optical viewfinder system, and a retraction position outside the photographing optical path.

Object light guided to the optical viewfinder system by the mirror 203 forms an image on a focusing screen 204. The object light having passed through the focusing screen 204 passes through a condenser lens 205 for improving the visibility of the viewfinder, and a pentagonal roof prism 206 for restoring an erect image. The object light is then guided to an eyepiece lens 208 and photometry sensor 207.

A rear curtain 209 and a front curtain 210 form a focal plane shutter (mechanical shutter). The two curtains 209 and 210 are opened and closed to expose, for a necessary time, an imaging device 418 which is arranged behind them and formed from a CCD sensor or CMOS sensor.

A printed board 211 holds the imaging device 418. A printed board 215 is further arranged behind the printed board 211. The LCD monitor 417 and a backlight 416 are arranged on a surface of the printed board 215 that is opposite to the printed board 211.

The camera body 100 incorporates a recording medium 419a for recording image data, and a battery 217 serving as a portable power supply. The recording medium 419a and battery 217 are detachable from the camera body 100.

Figure 3:
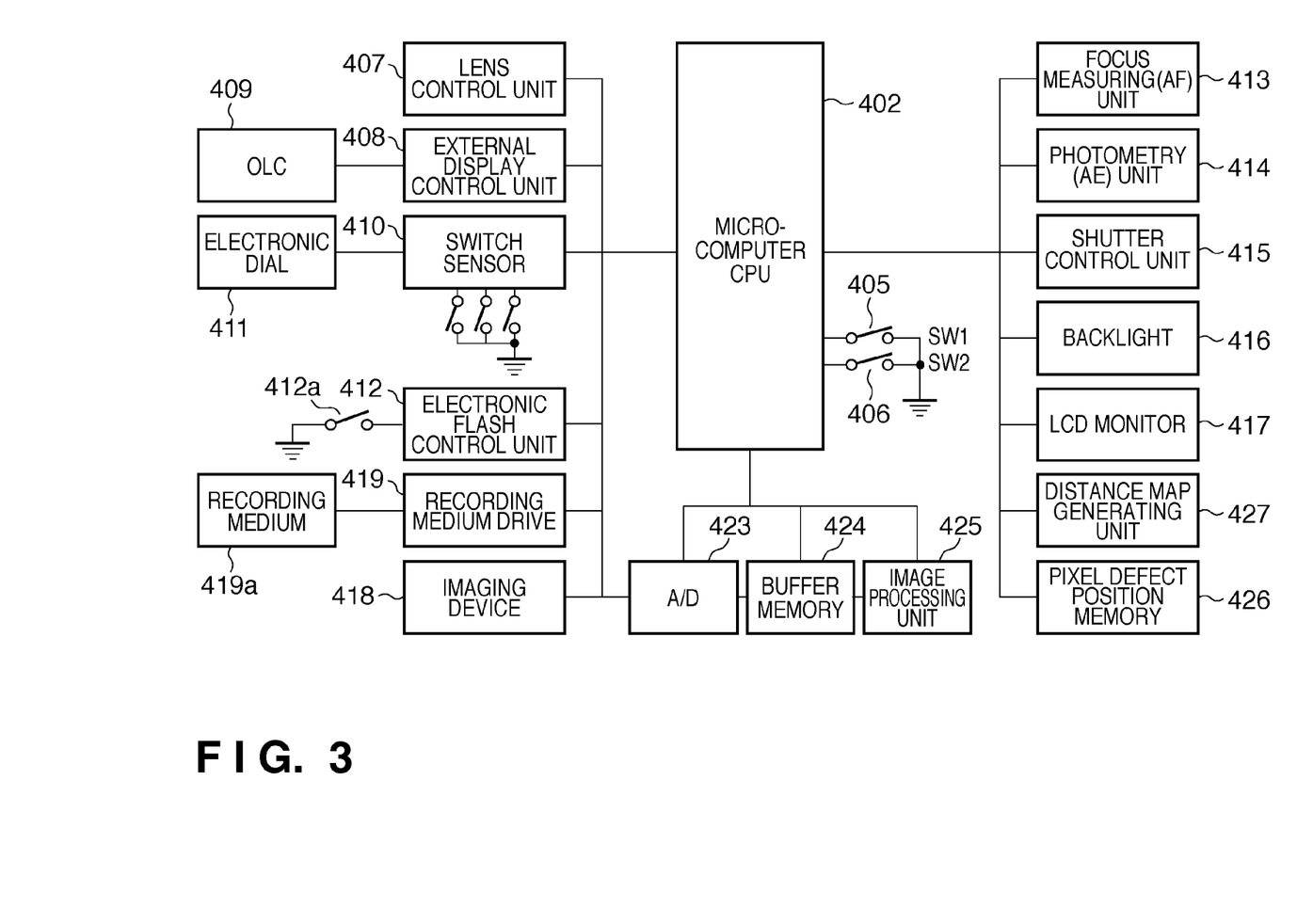
FIG. 3 is a block diagram exemplifying an arrangement regarding control, shooting, and image processing of the digital camera.

FIG. 3 is a block diagram exemplifying an arrangement regarding control, shooting, and image processing of the digital camera.

A microcomputer (CPU) 402 controls the operation of the whole camera, including processing of image data output from the imaging device 418 and controlling of the display on the LCD monitor 417.

A switch (SW1) 405 is turned on by operating the release button 112 halfway (half stroke). When the switch (SW1) 405 is turned on, the camera body 100 enters the shooting preparation state. A switch (SW2) 406 is turned on by operating the release button 112 completely (full stroke). When the switch (SW2) 406 is turned on, the camera body 100 starts the shooting operation.

A lens control unit 407 communicates with the photographing lens 200 to control driving of the photographing lens 200 and that of aperture blades in AF. An external display control unit 408 controls the external display (OLC) 409 and a display (not shown) within the viewfinder. A switch sensor 410 is an interface for transferring signals output from many switches and keys including the electronic dial 411 to the CPU 402.

An electronic flash control unit 412 is grounded via an X contact 412a, and controls emission and adjustment of light from an external electronic flash. The recording medium 419a such as a hard disk or memory card is mounted on a recording medium drive 419.

A focus measuring unit 413 detects the defocus amount of an object for AF. In the embodiment, either of "normal" and "live view" modes is selectable as the AF mode. In the normal mode, the defocus amount is detected using an AF sensor (not shown) in the camera body. In the live view mode, image data which is reduced to increase the transfer speed are sent from an image processing unit 425, and the local contrast of a designated position is calculated to determine the defocus amount. The reduced image data from the image processing unit 425 is also sent to a distance map generating unit 427.

A photometry unit 414 measures the brightness of an object to control the exposure time. A shutter control unit 415 controls the mechanical shutter to achieve correct exposure for the imaging device 418. The LCD monitor 417 and backlight 416 form a display device, as described above.

The image processing unit 425 includes a digital signal processor (DSP). A pixel defect position memory 426 is a nonvolatile memory which memorizes the presence of a defective pixel in the image sensor. The pixel defect position memory 426 also stores programs to be executed by the CPU 402.

A distance map generating unit 427 generates a distance map by calculating the object distance of each pixel in reduced image data based on the reduced image data sent from the focus measuring unit 413 and its shooting distance. Details of the distance map generation processing will be described later. The shooting distance is a distance from a focused object to the image sensor surface. The object distance is a distance between the image sensor surface and a given object at a position corresponding to the pixel of interest. That is, the shooting distance is determined uniquely for a captured image, and the object distance is determined for each pixel.

When the switch (SW2) 406 is turned on, the image processing unit 425 applies sharpness processing to image data using a distance map obtained from the distance map generating unit 427. Details of the sharpness processing will be described later.

The CPU 402 is further connected to an analog-to-digital (A/D) converter 423 and a buffer memory 424 for buffering image data.

A captured image converted into an electrical signal of each pixel by the image sensor is processed by the A/D converter 423, image processing unit 425, and the like, and sent as image data to the focus measuring unit 413 or recording medium 419a. Image data is sent to the focus measuring unit 413 when the AF mode is the live view mode. In this case, the image processing unit 425 reduces the image data to increase the transfer speed, as described above. To the contrary, image data is sent to the recording medium 419a when the switch (SW2) 406 is turned on. In this case, the image data is output without reducing it unless otherwise designated.

●Distance Map Generation Processing

Figure 4:
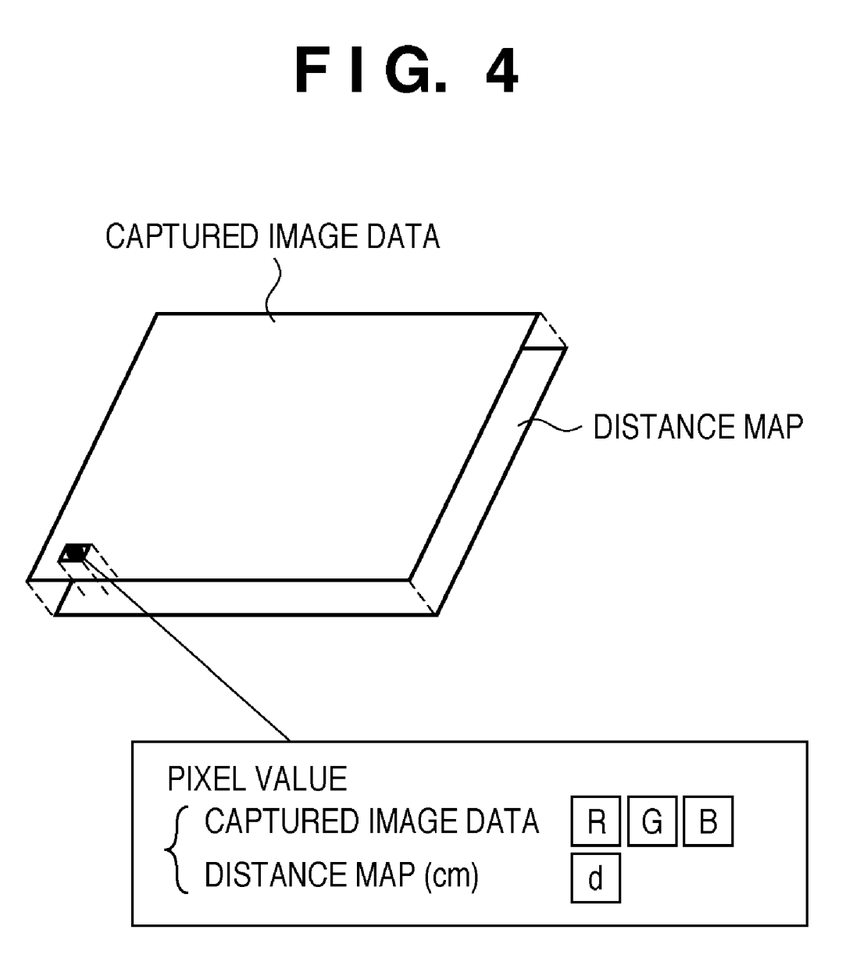
FIG. 4 is a view exemplifying a distance map.

FIG. 4 is a view exemplifying a distance map.

The distance map in the first embodiment is a bitmap having the same resolution as the image resolution of captured image data. The distance map holds a distance (cm) to the object as 2-byte data for each pixel. Although this format cannot express infinity, 65,535 cm can be regarded as infinity.

Distance map generation processing by the distance map generating unit 427 according to the first embodiment will be explained in detail.

The first embodiment requires object distance information of each pixel. As a method of generating a distance map, for example, refocus processing described in US2007/0252074A1 or US2007/0230944A1 is available. When refocus processing is adopted, distance information of each pixel can be acquired by changing the virtual image sensor position from a position corresponding to the shortest shooting distance to one corresponding to infinity. The distance map can also be generated by a method as described in Japanese Patent Laid-Open No. 8-163423. The distance may be estimated using triangulation from a plurality of parallax images.

In the first embodiment, the distance map is generated by the following method to quickly execute processing while maintaining the resolution of a captured image.

In AF processing, the focus adjustment range is searched for a portion where the local contrast maximizes within a focus measuring frame selected automatically or manually. In shooting in the live view mode according to the first embodiment, an image having the same angle of view as that of a captured image can be obtained though its resolution is low, since an image is displayed on the LCD monitor 417 on the rear side of the camera during search. In the first embodiment, a low-resolution distance map is generated by holding a distance at which the local contrast maximizes for each pixel.

In actual AF processing, after rough search is done first, only a specific range is searched finely to adjust the focus. The distance and local contrast are held for each pixel, and the local contrast is spline-interpolated to estimate the object distance. The distance map generating unit generates a distance map from low-resolution captured images (reduced images) acquired at a plurality of search points in AF processing.

Figure 5:
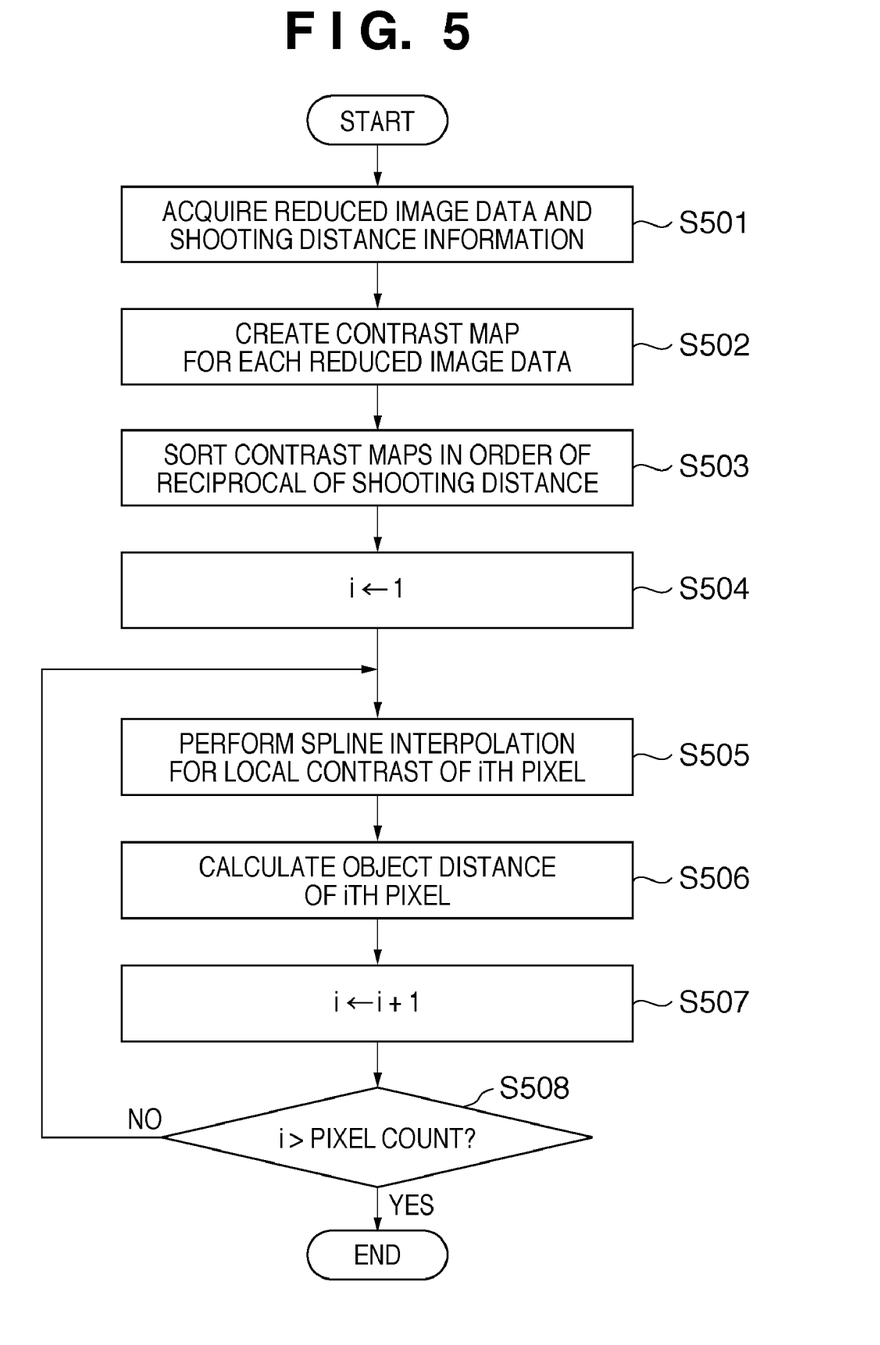
FIG. 5 is a flowchart showing low-resolution distance map generation processing in an embodiment.

FIG. 5 is a flowchart showing low-resolution distance map generation processing by the distance map generating unit 427 in the first embodiment.

In step S501, the distance map generating unit 427 acquires each reduced image data sent from the focus measuring unit 413 and shooting distance information of each reduced image sent from the lens control unit 407. In step S502, the distance map generating unit 427 obtains the local contrast of each pixel in each reduced image data, generating a contrast map for each reduced image data. The local contrast is defined as the difference between the luminance of the pixel of interest and the average of the luminance values of pixels falling within a predetermined distance from the pixel of interest.

In step S503, the distance map generating unit 427 sorts a plurality of contrast maps generated for respective reduced image data in order of the reciprocals of shooting distances acquired in step S501. The reason why the reciprocal of the shooting distance is used is that the precision of an acquirable object distance becomes higher for a nearer distance.

Figure 6:
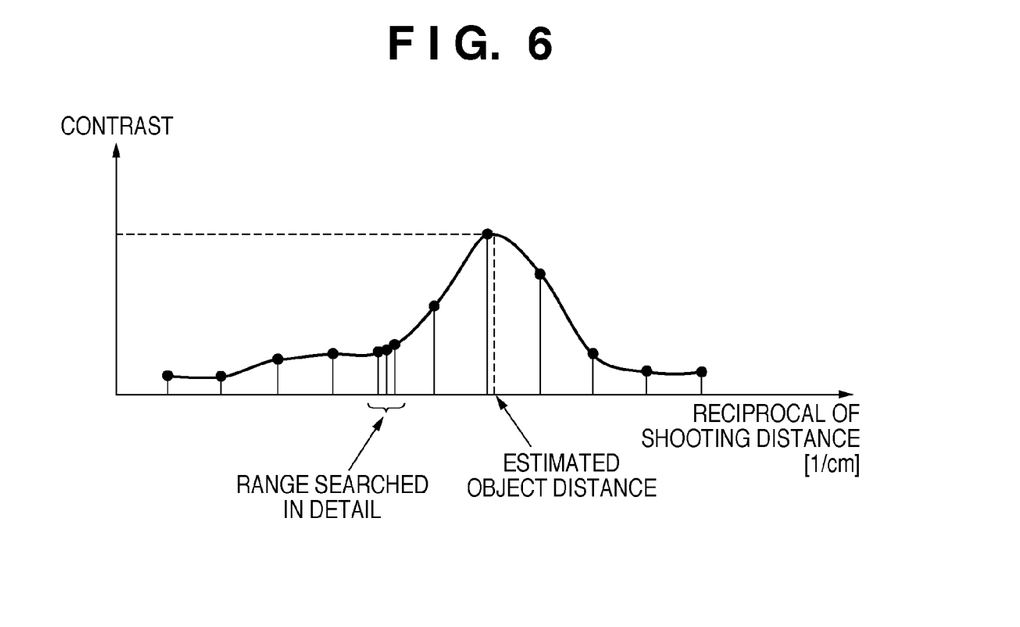
FIG. 6 is a graph exemplifying estimation of the object distance of a pixel outside a region designated by the focus measuring frame.

In step S504, the distance map generating unit 427 initializes a counter i to one. In step S505, the distance map generating unit 427 reads out the local contrast of the ith pixel from a plurality of contrast maps and performs spline interpolation, generating the correspondence between the reciprocal of the shooting distance and the contrast as shown in FIG. 6. In step S506, the distance map generating unit 427 calculates, based on the generated correspondence, a point (estimated object distance) where the local contrast maximizes. The distance map generating unit 427 linearly interpolates the reciprocals of the shooting distances of two, preceding and succeeding reduced image data sandwiching the point. The distance map generating unit 427 calculates the reciprocal of the resultant value, obtaining the object distance of the ith pixel.

In step S507, the distance map generating unit 427 increments the counter i by one. In the S508, the distance map generating unit 427 compares i with the pixel count of the reduced image data. If i is larger than the pixel count (YES in step S508), the process ends; if NO, the distance map generating unit 427 repeats the processes in steps S505 to S507.

By this processing, the shooting distance at each pixel can be calculated, generating a distance map.

FIG. 6 is a graph exemplifying estimation of the object distance of a pixel outside a region designated by the focus measuring frame. In FIG. 6, the abscissa represents 1/shooting distance, that is, the reciprocal of the shooting distance, and the ordinate represents a contrast obtained in step S502. In the first embodiment, the contrast is calculated for all reduced image data. By using a position where a spline-interpolated contrast value maximizes, the object distance of the pixel of interest is calculated. In the example shown in FIG. 6, the pixel of interest falls in a region outside the focus measuring frame, so the estimated object distance is out of the detailed search range.

Finally, the distance map generating unit 427 enlarges and interpolates the low-resolution distance map obtained by the foregoing method, attaining a distance map having the same resolution as that of a captured image. Although enlargement and interpolation may employ any method, the first embodiment adopts bicubic interpolation capable of providing a satisfactory interpolation result at low calculation cost.

By this processing, a distance map having the same resolution as that of a captured image can be generated with a small amount of memory to be used.

●Sharpness Processing

Sharpness processing as a feature of the first embodiment will be explained.

When the main object and background are spaced apart from each other, separation between them can be improved to obtain a high-quality result in which the main object is emphasized. Thus, the first embodiment applies higher-degree edge enhancement processing to a pixel closer to the boundary between the main object and the background. More specifically, the difference in distance between the pixel of interest and its surrounding pixel is calculated. For a larger difference, stronger sharpness correction is applied. By this processing, stronger sharpness correction can be applied when distance between the main object and the background is larger.

Figure 7:
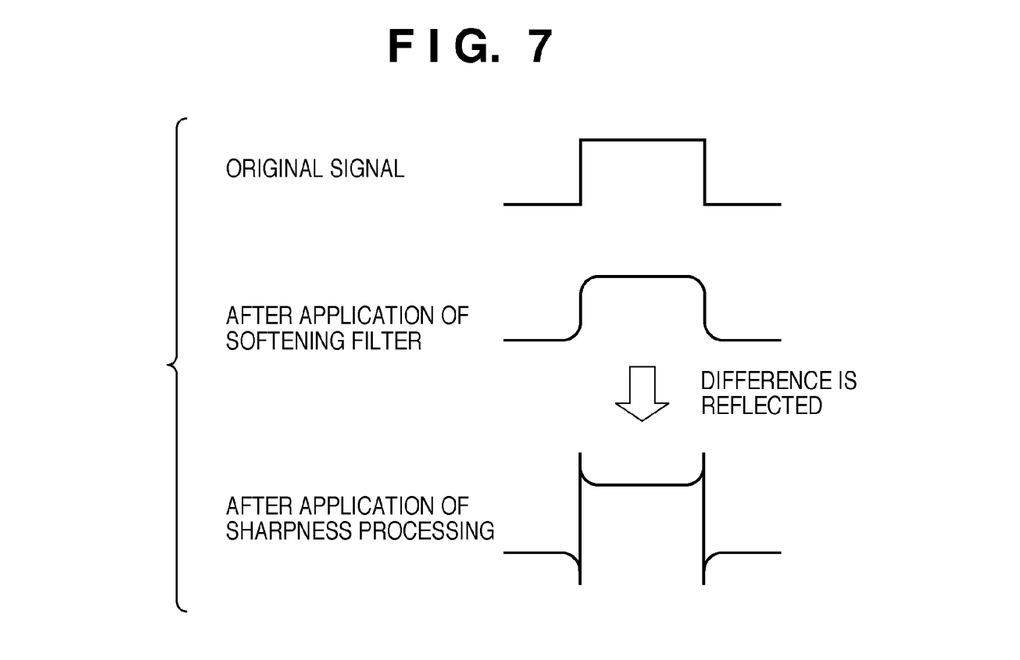
FIG. 7 is a view showing the outline of unsharp masking processing.

The sharpness processing in the first embodiment is unsharp masking processing. FIG. 7 shows the outline of the unsharp masking processing. In the unsharp masking processing, as shown in FIG. 7, a softening filter is applied to a local region centered on the pixel of interest. The difference between pixel values before and after softening processing is reflected in the pixel value of the pixel of interest, achieving the edge enhancement.

Unsharp masking processing to a pixel to be processed, having a pixel value P, can be expressed in a following formula (1) using the processed pixel value P', the radius R of the softening filter, and the degree A (%) of sharpening:

$$P'(i,j) = P(i,j) + (P(i,j) - F(i,j,R)) \times A/100 \quad (1)$$

where $F(i,j,R)$ is a pixel value obtained by applying the softening filter having the radius R to the pixel $P(i,j)$. The softening processing in the first embodiment is Gaussian softening. The Gaussian softening is to perform weighting and averaging using a Gaussian distribution corresponding to the distance from a pixel to be processed. The Gaussian softening can provide a natural processing result. The radius R of the softening filter is related to the frequency of an image to which sharpness processing is applied. More specifically, a fine texture is enhanced for a smaller R and a rough texture is enhanced for a larger R.

Figure 8:
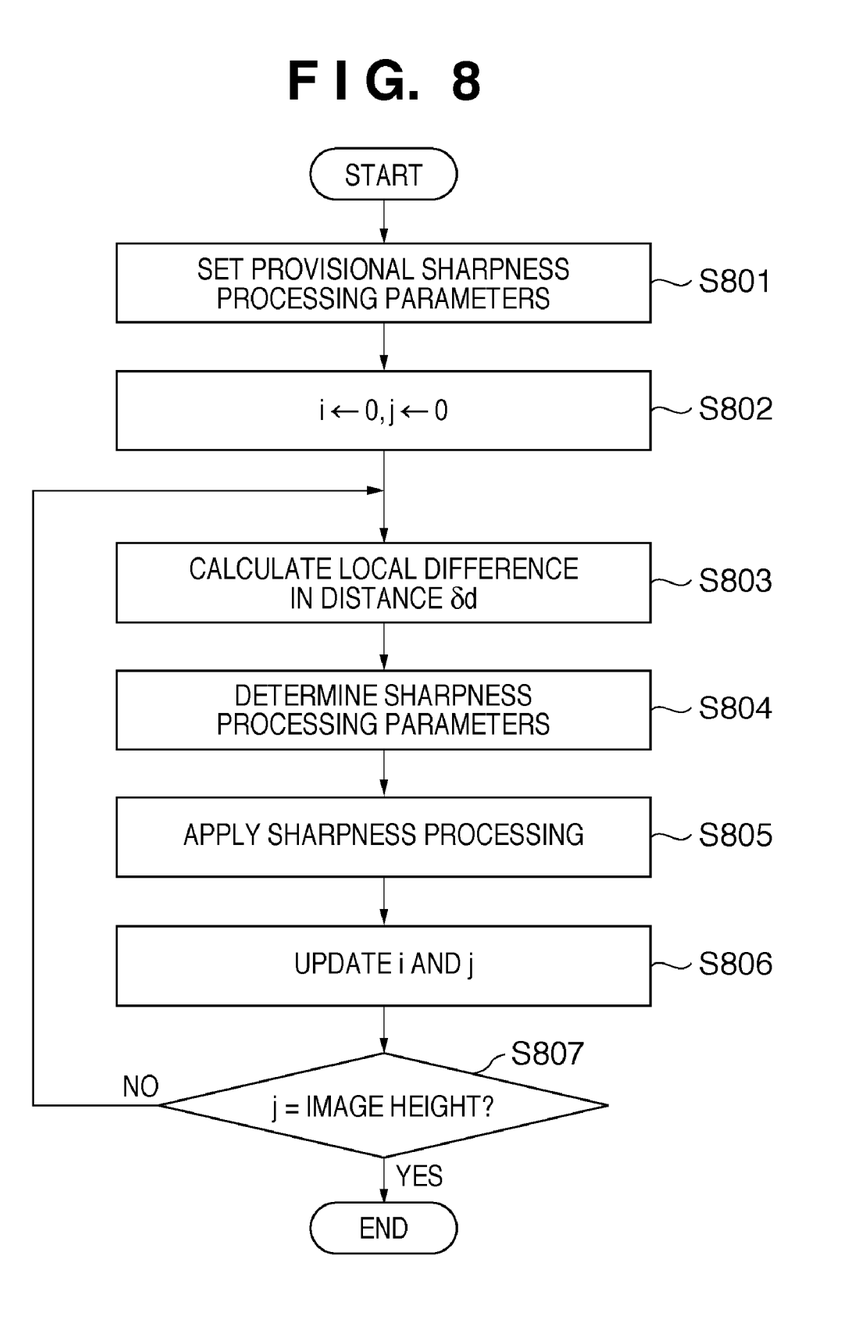
FIG. 8 is a flowchart showing sharpness processing in the embodiment.

FIG. 8 is a flowchart showing sharpness processing in the first embodiment.

In step S801, the image processing unit 425 sets the radius r and the degree a of sharpening as provisional sharpness processing parameters for image data to be processed. In step S802, the image processing unit 425 initializes pixel reference variables i and j to 0.

In step S803, the image processing unit 425 acquires a local difference in distance δd by referring to data d(i,j) on a distance map corresponding to the pixel P(i,j) to be processed. The method of calculating the local difference in distance δd will be described later.

In step S804, by using the local difference in distance δd obtained in step S803, the image processing unit 425 corrects the provisional sharpness processing parameters r and a calculated in step S801, deciding sharpness processing parameters R and A. Details of the method of correcting sharpness processing parameters will be described later.

In step S805, based on the sharpness processing parameters R and A determined in step S804, the image processing unit 425 applies sharpness processing to the pixel to be processed. In step S806, the image processing unit 425 updates the variables i and j. In updating, i is incremented one by one, and when i reaches the same value as the width of image data to be processed, i is initialized to 0 and j is incremented.

In step S807, the image processing unit 425 determines whether sharpness processing has been applied to all pixels. If an unprocessed pixel remains, the process returns to step S803. If all pixels have been processed, that is, j has reached the same value as the height of image data to be processed, the process ends.

Note that the provisional sharpness processing parameters set in the first embodiment are the radius r and the degree a of sharpening, which are designated by the user in advance. For example, the radius r=10 and the degree a of sharpening=100 are set as initial values of the provisional sharpness processing parameters.

● Method of Calculating Local Difference in Distance δd

The method of calculating the local difference in distance δd in step S803 will be described in detail.

Let d(i,j) be data on a distance map corresponding to the pixel P(i,j) of interest to be processed, and d(p,q) be data on a distance map corresponding to all surrounding pixels falling within a region of a radius L centered on the pixel P(i,j) of interest. Then, the first embodiment defines a local difference in distance δd(i,j) corresponding to the pixel P of interest by $$\delta d(i,j) = \Sigma(|d(i,j) - d(p,q)|)/n \quad (2)$$

where n is the number of pixels determined as surrounding pixels. That is, the local difference in distance δd is defined as the average of the absolute values of the differences in object distance between the pixel P of interest and its surrounding pixels. Note that the radius R used in unsharp masking processing and the radius L for determining surrounding pixels may be determined independently.

This reveals that δd(i,j) is highly likely to become small when a region including surrounding pixels falls within one object, and large when the region lies across different objects. Especially when the main object and background are spaced apart from each other, δd(i,j) takes a very large value near the boundary between them.

The first embodiment has exemplified a case in which all pixels falling within the radius L are handled equally regardless of the distance between the pixel to be processed and its surrounding pixel. However, the local difference in distance δd may be calculated in consideration of the distance between the pixel to be processed and its surrounding pixel by using a Gaussian distribution or the like.

● Method of Correcting Sharpness Processing Parameter

The method of correcting sharpness processing parameters in step S804 will be described in detail.

In the first embodiment, the degree A of sharpening is changed among the sharpness processing parameters. The degree A(i,j) of sharpening for the pixel P(i,j) of interest to be processed is calculated by $$A(i,j) = a \times (1 - 1/\delta d(i,j)) \quad (3)$$

where a is the degree of sharpening set as a provisional sharpness processing parameter in step S801. According to equation (3), the degree A(i,j) of sharpening becomes higher for a larger local difference in distance δd. Hence, the first embodiment can apply stronger sharpness processing to a pixel having a larger difference in distance from the surrounding pixel.

As described above, the first embodiment applies sharpness processing in accordance with the local difference in distance. Since sharpening is applied such that the sharpness is improved more when the local difference in distance is larger, separation between the object and the background can be improved.

Second Embodiment

The second embodiment according to the present invention will be described below.

As described above in the first embodiment, the filter radius R is related to the target frequency of edge enhancement in edge enhancement processing using unsharp masking. When the radius R is small, a fine texture on the object surface is enhanced. When the radius R is large, the unsharp masking will be more suitable for enhancement of the boundary between the object and the remaining region.

The second embodiment will explain a method of deciding not the degree of sharpening but the radius R of the sharpening filter (unsharp masking) based on the local difference in distance δd between the pixel of interest and its surrounding pixel.

Sharpness processing in the second embodiment is executed according to the procedures shown in the flowchart of FIG. 8, similar to the first embodiment, but the method of correcting the sharpness processing parameter is different. Although the method of calculating the local difference in distance δd may be the same as that in the first embodiment, the second embodiment will describe another method. That is, the sharpness processing in the second embodiment is different from that in the first embodiment in the method of calculating the local difference in distance δd in step S803 of FIG. 8 and the method of correcting sharpness processing parameters in step S804. The differences from the first embodiment will be described.

●Method of Calculating Local Difference in Distance δd

The method of calculating the local difference in distance δd in step S803 will be described in detail.

In the second embodiment, the local difference in distance δd is calculated in consideration of gradients in four directions using a pixel to be processed as the center.

Figure 9:
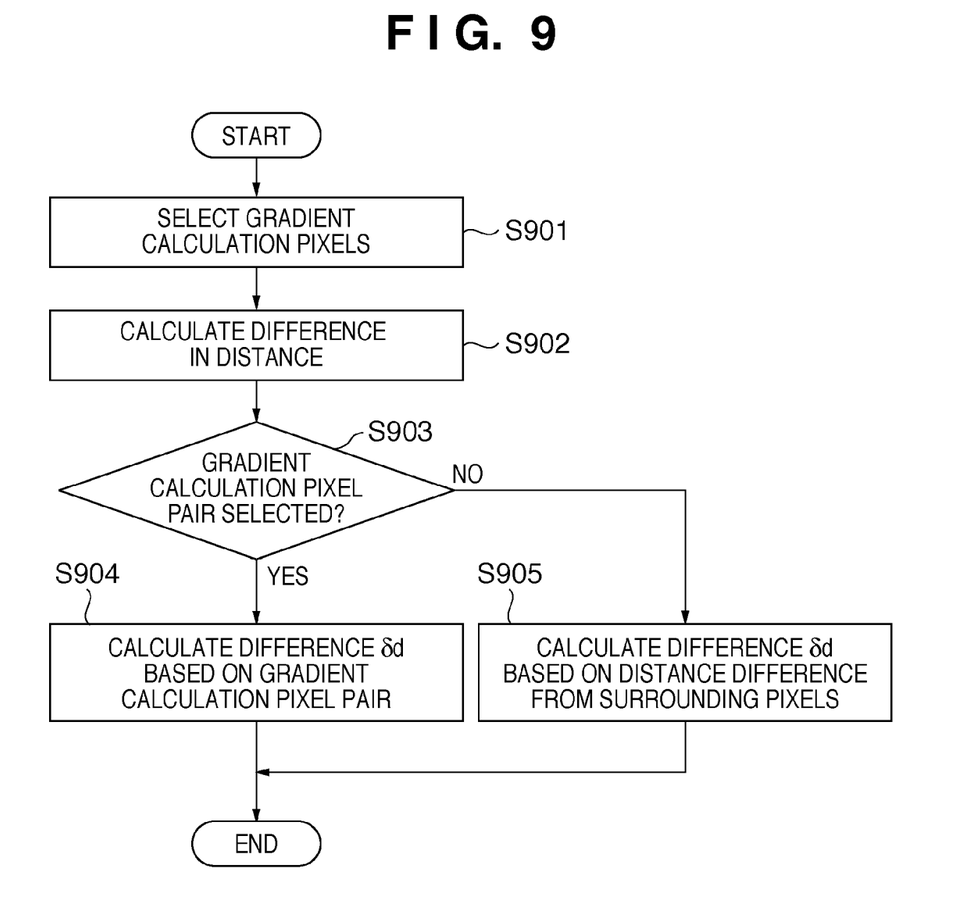
FIG. 9 is a flowchart showing processing of calculating a local difference in distance δd in the second embodiment.

FIG. 9 is a flowchart showing processing of calculating the local difference in distance δd in the second embodiment.

Figure 10:
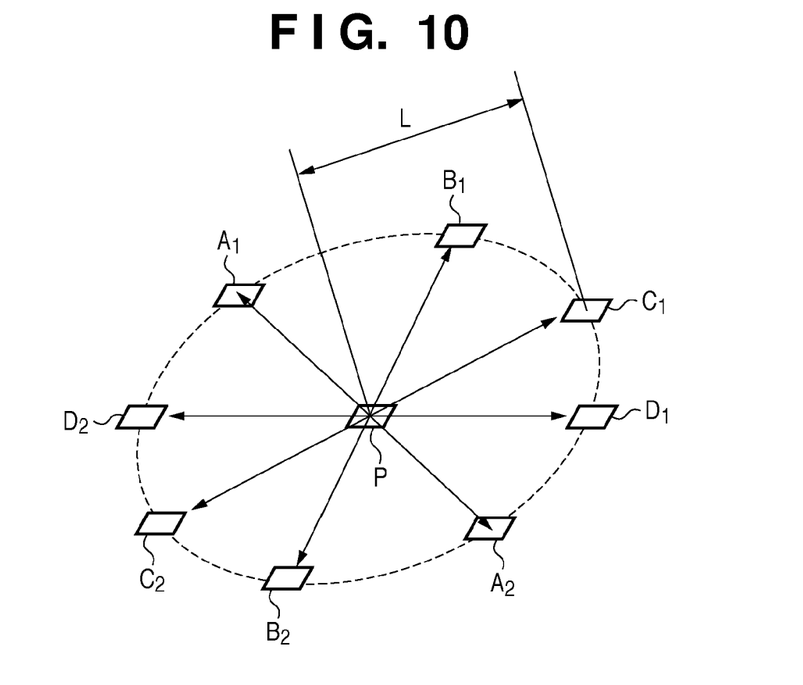
FIG. 10 is a view exemplifying four pairs of gradient calculation pixels around a pixel P to be processed as a center.

In step S901, an image processing unit 425 selects four surrounding pixel pairs as gradient calculation pixel pairs (A1-A2, B1-B2, C1-C2, and D1-D2) by using a pixel P to be processed as the center, as shown in FIG. 10. In step S902, the image processing unit 425 selects, from the four surrounding pixel pairs, pixel pairs exhibiting a monotonically increasing or decreasing distance change between each paired pixel. The image processing unit 425 calculates a difference in distance ΔD for each selected pixel pair:

$$\Delta D = (|P1 - P(i,j)| + |P2 - P(i,j)|)/2 \qquad (4)$$

where P1 and P2 are the object distances of each of the two paired pixels selected.

In step S903, the image processing unit 425 determines whether one or more change amounts ΔD have been obtained in step S902. If YES in step S903, the process advances to step S904; if NO, to step S905. That is, if a pixel pair exhibiting a monotonically increasing or decreasing distance change has been selected from the four pixel pairs selected in step S901, the process advances to step S904; if no such pixel pair is selected, to step S905.

In step S904, the image processing unit 425 determines the local difference in distance δd from the obtained change amount ΔD. If a plurality of differences in distance ΔD are obtained for a plurality of pixel pairs, that is, a plurality of pixel pairs have a monotonically increasing or decreasing distance change, a maximum difference in distance ΔD is selected and set as the local difference in distance δd.

In step S905, the image processing unit 425 calculates the local difference in distance δd by the same method as that in the first embodiment.

By this processing, the second embodiment can calculate the local difference in distance δd which reflects the object edge much more.

The second embodiment has exemplified a case in which the difference in distance ΔD is selected for one pixel pair and calculated as the local difference in distance δd. It is also possible to select up to N pairs (2 pairs, for example) as gradient calculation pixels and calculate the weighted average of ΔD or the like as δd. The local differences in distance δd of adjacent pixels may vary greatly near the selected pixel pair. Hence, the local differences in distance of all pixels may be calculated once, and variations in local difference in distance between adjacent pixels may be suppressed by applying a Gaussian softening filter or the like.

●Method of Correcting Sharpness Processing Parameter

The method of correcting sharpness processing parameters in step S804 will be described in detail.

In the second embodiment, the radius R of the sharpening filter is changed among the sharpness processing parameters. The radius R(i,j) of the sharpening filter for the pixel P(i,j), which is of interest and to be processed, is calculated by $$R(i,j) = r \times (1 - 1/\delta d(i,j)) \qquad (5)$$

where r is the radius set as a provisional sharpness processing parameter in step S801. When the radius R is calculated to be smaller than 0.5 according to equation (5), R=0.5 is set. According to equation (5), the radius R(i,j) of the sharpening filter becomes larger for a larger local difference in distance δd(i,j). Thus, the second embodiment can apply stronger sharpening to a lower-frequency region as the difference in distance from a surrounding pixel increases.

When the radius of unsharp masking processing decreases, sharpening sometimes seems relatively weak even at the same degree of sharpening. In the second embodiment, therefore, the degree A of sharpening is corrected in addition to the radius R:

$$A(i,j) = a \times (w - R(i,j)/r) \qquad (6)$$

where a and r are the degree of sharpening and the radius set as provisional sharpness processing parameters in step S801, respectively, and w is a coefficient for applying a higher degree of sharpening. When the radius R decreases owing to a small local difference in distance δd(i,j), sharpening can be applied w times more strongly to the maximum. For example, w=2 in the second embodiment.

In general, the difference in distance between the object and the background tends to be large with a short shooting distance, and thus the depth of field tends to be shallow. In contrast, a long shooting distance leads to a great depth of field. A smaller F-number of the lens leads to a shallow depth of field. Further, a short focal length of the lens tends to lead to a great depth of field.

When a depth of field is shallow, a main object and background are often intended to be separated. Therefore in this case, the radius R of sharpness processing may be set to be larger for a shallower depth of field and a larger local distance difference. If the radius R is set to a small value and unsharp masking processing is applied to an unfocused region outside the depth of field, only noise is emphasized in most cases. Therefore in this case, the degree A of sharpening may be set to be smaller for a shallower depth of field and a smaller local distance difference, since the same object is highly likely to lie across regions inside and outside the depth of field.

In this manner, in the second embodiment, the shooting conditions (e.g., shooting distance, lens F-number, and lens focal length) of a captured image may be acquired, and sharpness processing parameters may be set based on the various conditions and the difference in object distance.

The second embodiment does not consider a distance relative to the shooting distance, in equations (4) to (6) for calculating the correction amounts of sharpening parameters. Alternatively, the sharpening parameters may be calculated using the relative distance in addition to the local difference in distance.

●Example of Sharpness Processing

Sharpness processing in the second embodiment will be exemplified.

Figure 11:
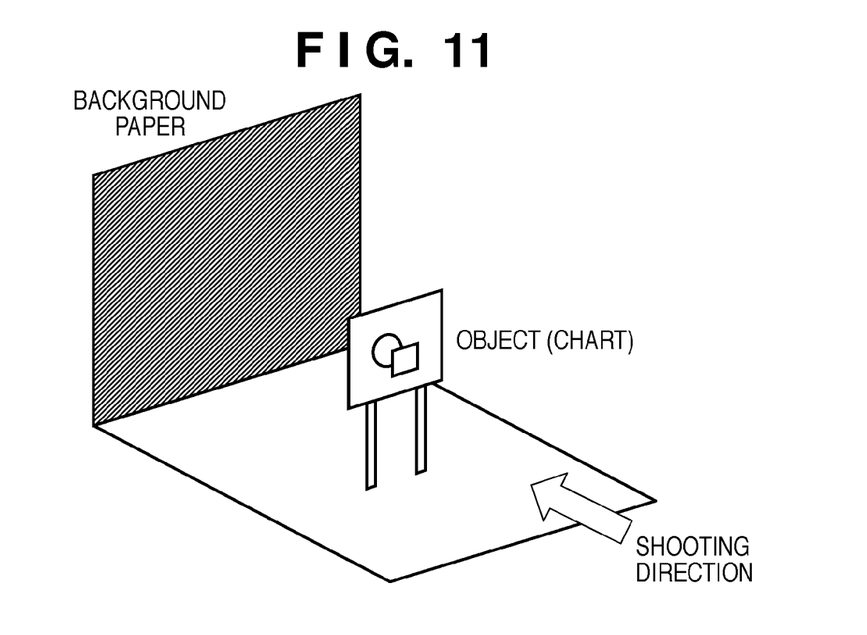
FIG. 11 is a view showing a state in which an object is captured.

An example will be explained in which a studio as shown in FIG. 11 is prepared and an object (chart in this example) is captured.

Figure 12A:
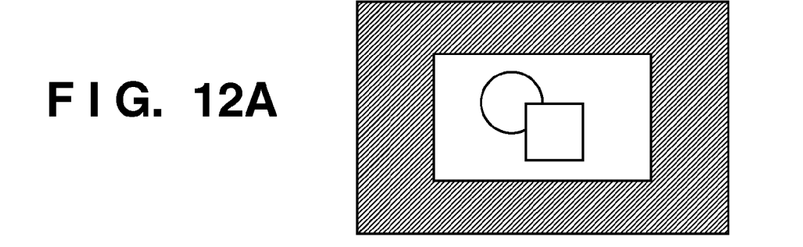
FIGS. 12A to 12D are views showing examples of sharpness processing in the second embodiment.

When no sharpening is applied, a captured original image as shown in FIG. 12A is obtained.

Figure 12B:
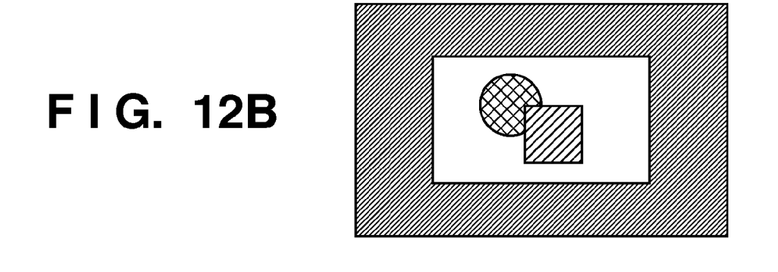
Figure 12C:
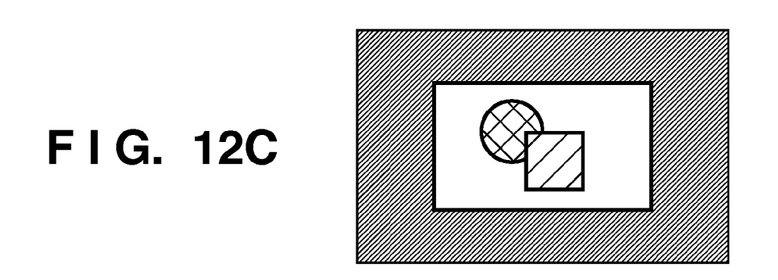

Sharpening applied with a small radius uniformly to the entire image yields a captured image as shown in FIG. 12B. In the captured image of FIG. 12B, a fine texture is enhanced when the object (chart) is enlarged, but the resolution becomes almost the same as that of the original image when the captured image is reduced and displayed. To the contrary, sharpening applied with a large radius to the entire frame yields a captured image as shown in FIG. 12C. In the captured image of FIG. 12C, the boundary between the object edge and the background thickens in a reduced image, increasing the sharpness. However, the texture of the object surface is not enhanced, and may be lost in some cases. When the image is enlarged and displayed, the resolution becomes low.

Figure 12D:
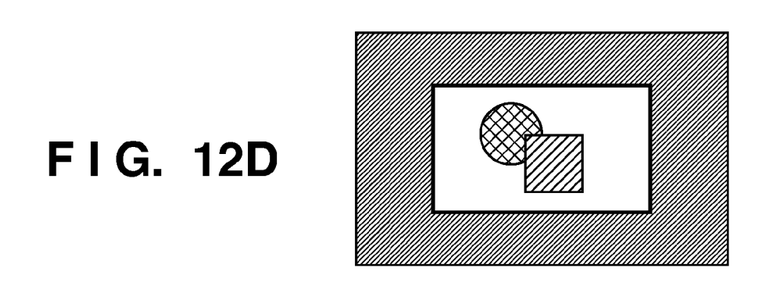

To prevent this, the radius R of unsharp masking is determined based on the method of the second embodiment, that is, the local difference in distance, and sharpening is applied, obtaining a result as shown in FIG. 12D. In the image of FIG. 12D, unsharp masking processing with a large radius is applied to the object edge (boundary), and that with a small radius is applied to the remaining object portion and the background paper portion. Captured image data can therefore be displayed so that when the image is enlarged, the texture of the object surface become clear, and even when the image is reduced, the object edge becomes thick to clearly separate the object and background.

As described above, the second embodiment determines the radius R of unsharp masking based on the local difference in distance δd. Compared to unsharp masking processing applied to the entire frame with the same parameter, the unsharp masking processing of the second embodiment can provide an image with improved separation between the object and the boundary while enhancing a fine texture on the object surface. A high-quality captured image can always be obtained regardless of the depth of field.

The second embodiment has exemplified a case in which the radius R of the sharpening filter, that is, the filter size is set in accordance with the local difference in distance δd. Instead, the filter coefficient may be controlled depending on the difference δd.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-003995, filed Jan. 9, 2009, which is hereby incorporated by reference herein in its entirety.

What is claimed is:

1. An image processing apparatus which corrects a captured image obtained by capturing an object, the apparatus comprising:
    an acquiring unit configured to acquire, for each pixel of the captured image, information on an object distance representing a distance to the object;
    a calculating unit configured to calculate, based on the information on the object distance, a difference in the object distance between a pixel of interest in the captured image and a surrounding pixel of the pixel of interest;
    a parameter setting unit configured to set a sharpening process parameter for the pixel of interest based on the calculated difference in the object distance; and
    a sharpening process unit configured to perform a sharpening process for the pixel of interest by using the set parameter.

2. The apparatus according to claim 1, wherein said parameter setting unit sets a degree of sharpening and a filter size of the sharpening process as the parameter.

3. The apparatus according to claim 2, wherein said parameter setting unit sets the degree of sharpening larger for a larger difference in the object distance.

4. The apparatus according to claim 2, wherein said parameter setting unit sets the filter size larger for a larger difference in the object distance.

5. The apparatus according to claim 4, wherein said parameter setting unit sets a radius of unsharp masking as the filter size.

6. The apparatus according to claim 1, wherein
    said acquiring unit generates a distance map representing the information on the object distance for each pixel of the captured image, and
    said calculating unit calculates the difference in the object distance based on the distance map.

7. The apparatus according to claim 6, wherein said acquiring unit generates the distance map by calculating the object distance of each pixel based on a shooting distance of the captured image and contrast information of each pixel.

8. The apparatus according to claim 7, wherein said acquiring unit generates a low-resolution distance map based on a reduced captured image, and enlarges and interpolates the low-resolution distance map to generate the distance map.

9. The apparatus according to claim 1, wherein said calculating unit calculates an average of differences in the object distance between the pixel of interest and a plurality of surrounding pixels of the pixel of interest.

10. The apparatus according to claim 9, wherein said calculating unit calculates the difference in the object distance based on a gradient between a pair of surrounding pixels sandwiching the pixel of interest.

11. The apparatus according to claim 1, further comprising a shooting condition acquiring unit configured to acquire shooting conditions of the captured image,
    wherein said parameter setting unit sets the parameter based on the shooting conditions and the difference in the object distance.

12. The apparatus according to claim 11, wherein the shooting conditions include at least one of a shooting distance, a lens F-number, and a lens focal length.

13. An image processing method of correcting a captured image obtained by capturing an object, the method comprising the steps of:
- acquiring, for each pixel of the captured image, information on an object distance representing a distance to the object;
- calculating, based on the information on the object distance, a difference in the object distance between a pixel of interest in the captured image and a surrounding pixel of the pixel of interest;
- setting a sharpening process parameter for the pixel of interest based on the calculated difference in the object distance; and
- performing a sharpening process for the pixel of interest by using the set parameter.

14. A non-transitory computer-readable storage medium storing a program for controlling a computer apparatus to function as each unit of an image processing apparatus defined in claim 1.

* * * * *